(12) United States Patent
Jiang et al.

(10) Patent No.: US 7,550,873 B2
(45) Date of Patent: Jun. 23, 2009

(54) UNINTERRUPTIBLE POWER SUPPLY FOR HOME/OFFICE NETWORKING AND COMMUNICATION SYSTEM

(76) Inventors: Ming Jiang, 455 Barnesley La., Alpharetta, GA (US) 30022; Min Shi, 455 Barnesley La., Alpharetta, GA (US) 30022

( * ) Notice: Subject to any disclaimer, the term of this patent is extended or adjusted under 35 U.S.C. 154(b) by 230 days.

(21) Appl. No.: 11/627,981

(22) Filed: Jan. 28, 2007

(65) Prior Publication Data
US 2008/0179956 A1 Jul. 31, 2008

(51) Int. Cl.
H02J 7/00 (2006.01)
H02J 9/00 (2006.01)
(52) U.S. Cl. .......................... 307/64; 307/66
(58) Field of Classification Search ............. 307/64–66, 307/44–46, 48
See application file for complete search history.

(56) References Cited

U.S. PATENT DOCUMENTS 6,157,169 A * 12/2000 Lee ............................ 320/132
6,795,322 B2 * 9/2004 Aihara et al. ................. 363/37
2003/0026113 A1 * 2/2003 Reilly et al. ................... 363/37

\* cited by examiner

Primary Examiner—Albert W. Paladini
Assistant Examiner—Carlos Amaya

(57) ABSTRACT

An uninterruptible power supply for home/office networking and communication system (UPS) comprising: (i) an AC-DC converter, (ii) a battery charger, (iii) a rechargeable battery array, (iv) a control circuit, and (v) a plurality of DC-DC voltage converters/voltage controllers, wherein, in operation, when an AC power supply is available, the UPS provides a plurality of DC voltage outputs to a plurality of loads Li, through the AC-DC converter, the control circuit, and the plurality of the DC-DC voltage converters/voltage controllers, and provides continuous DC charge to the rechargeable battery array, and when the AC power supply becomes unavailable, the control circuit detects the unavailability of the AC power supply, the UPS provides a plurality of DC voltage outputs to the plurality of loads Li, through an DC supply voltage of the rechargeable battery array, the control circuit, and the plurality of the DC-DC voltage converters/voltage controllers.

15 Claims, 5 Drawing Sheets

UNINTERRUPTIBLE POWER SUPPLY FOR HOME/OFFICE NETWORKING AND COMMUNICATION SYSTEM

FIELD OF THE PRESENT INVENTION

The present invention generally relates to an uninterruptible power supply. More particularly, the present invention relates to uninterruptible power supply for home/office networking and communication system.

BACKGROUND OF THE PRESENT INVENTION

Voice over Internet Protocol, also called VoIP, IP Telephony, Internet telephony, Broadband telephony, Broadband Phone and Voice over Broadband is the routing of voice conversations over the Internet or through any other IP-based network. Protocols which are used to carry voice signals over the IP network are commonly referred to as Voice over IP or VoIP protocols. When the internet is available, the VoIP technology makes the traditional fixed telephone (Public Switched Telephone Network, or PSTN) lines obsolete. It uses existing underutilized network capacity to complete voice communication, whether you are communicating with someone next door, or half way around the globe. The VoIP's use of internet as a media eliminates the use of traditional fixed line phone line and the concept of long distance phone calls. Many companies offer free domestic long distance service, and some even provide free international long distance service to many countries. The VoIP technology is currently a mature technology and this technology is very well accepted by millions of consumers as a replacement of a traditional PSTN phone line. Many companies offer such service to millions of consumers around the world.

The VoIP telephone service is usually configured to include: an internet service provider using a cable/DSL modem, a VoIP phone adapter, and an optional router/hub/switch for routing internet traffic to/from the VoIP phone adapter to the modem. This configuration requires the cable/DSL modem, the VoIP phone adapter, and the optional router/hub/switch to have individual power supply, usually a lower voltage direct current (DC) power supply. When any one of the power supply malfunctions and/or the electricity is not available, the VoIP phone system will stop working.

The traditional PSTN phone service has one advantage over the VoIP phone service: customers can still make a phone call when your electric power is not available. When electric power is not available, if the customer has a plain old telephone (not a cordless phone, since such cordless phone usually requires electric power), he/she can still make phone calls because the plain old telephone service (POTS) provide electric power to the phone line. Ability to make phone call, especially 911 call when electricity is not available is particularly important in an emergency situation, or the electric power is purposely cut off when a crime is been committed.

In order to overcome this shortcoming of VoIP phone system, an uninterruptible power supply is needed. An uninterruptible power supply (UPS) maintains a continuous supply of electric power to electrically coupled equipment by supplying power from a separate source such as a battery array, when a source of electricity normally used to supply power to the equipment is not available. A UPS is inserted between the source of electricity (typically commercial utility power) and the equipment it is supplying power. When a power failure or abnormality occurs, the UPS will effectively switch from the utility power to its own power source almost instantaneously. This is especially important to security monitoring systems with telephone connection to the monitoring companies. The UPS keeps the telephone system and security system operational and the wireless internet access available even when the electricity is not available.

While not limited to any particular type of equipment, a UPS is typically used to protect computers, telecommunication equipment or other electrical equipment where an unexpected power disruption could cause injuries, fatalities, serious business disruption or data loss. UPS units come in sizes ranging from units which will back up a single computer without monitor (around 200 VA) to units which will power entire data centers or buildings (several megawatts). Larger UPS units typically work in conjunction with generators.

Historically, UPS units were very expensive and were most likely to be used on expensive computer systems and in areas where the power supply is interrupted frequently. However, UPS units are now more affordable, and have become an essential piece of equipment for data centers and business computers, but are also used for personal computers, entertainment systems, home/office networking system, telecommunication system and more.

With increased demand for electricity, the electrical grid is under increasing strain particularly during heavy demand periods such as summer when air conditioning use is at its highest. In order to prevent blackouts, electrical utilities will sometimes use a process called load shedding, which involves cutting the power to large groups of customers for short periods of time. The single biggest event that brought attention to the need for UPS power backup units was the 2003 North America blackout in the north-eastern US and eastern Canada.

A UPS is not to be confused with a standby generator, which does not provide protection from a momentary power interruption and may result in an interruption when it is switched into service, whether manually or automatically. However, such generators are typically placed before the UPS to provide cover for lengthy outages.

Therefore, a heretofore unaddressed need exists in the art to address the aforementioned deficiencies and inadequacies.

SUMMARY OF THE PRESENT INVENTION

In one aspect, the present invention relates to an uninterruptible power supply (hereinafter "UPS") for home/office networking and communication system. In one embodiment, the UPS has: (i) a first input for receiving the phase wire of an AC power supply, (ii) a second input for receiving the neutral wire of the AC power supply, (iii) a plurality of output DC power terminals for a plurality of loads Li, $\{i\}=1, 2, \ldots, N$, N being a positive integer. Each of the plurality of the output DC power terminals has a first positive output terminal $L_{iP}$ for providing a positive DC voltage and a second output terminal $L_{iG}$ for providing a ground terminal. Each of the output DC power terminals is capable of providing a corresponding output DC voltage.

In one embodiment, the UPS includes: (i) an AC-DC converter adapted for converting the AC power supply connectable to the first input and second input from AC to DC to provide a first DC voltage VDC1, (ii) a battery charger, (iii) a rechargeable battery array, (iv) a control circuit, and (v) a plurality of DC-DC voltage converters/voltage controllers $\{VC_i\}$, i=1, 2, ..., N, corresponding to the plurality of loads Li.

The AC-DC converter has: (i) a first input coupling to the phase wire of the AC power supply, (ii) a second input coupling to the neutral wire of the AC power supply, (iii) a first output for providing a positive terminal of the first DC voltage $V_{DC1}$, and (iv) a second output for providing ground of the first DC voltage VDC1.

The battery charger has: (i) a first input coupling to the positive terminal of the first DC voltage VDC1 of the AC-DC converter, (ii) a second input coupling to the ground terminal of the first DC voltage VDC1 of the AC-DC converter, (iii) a first output for providing the positive terminal of the first DC voltage VDC1 to the first input of the rechargeable battery array, and (iv) a second output for providing the ground terminal of the first DC voltage VDC1 to the second input of the rechargeable battery array.

The rechargeable battery array has: (i) a first input for receiving a positive terminal of the first DC voltage $V_{DC1}$, (ii) a second input for receiving the ground terminal of the first DC voltage $V_{DC1}$, (iii) a first output for providing a positive terminal of a DC supply voltage $V_B$, and (iv) a second output for providing a ground terminal of the DC supply voltage $V_B$.

The control circuit has: (i) a first input coupling to the first output of the AC-DC converter for receiving the positive terminal of the first DC voltage $V_{DC1}$ from the AC-DC converter, (ii) a second input coupling to the second output of the AC-DC converter for receiving the ground terminal of the first DC voltage $V_{DC1}$ from the AC-DC converter, (iii) a third input coupling to the first output of the rechargeable battery array for receiving the positive terminal of the DC supply voltage $V_B$ from the rechargeable battery array, (iv) a fourth input coupling to the second output of the rechargeable battery array for receiving the ground terminal of the DC supply voltage $V_B$ from the rechargeable battery array, (v) a first output for providing positive terminal of a second DC voltage $V_{DC2}$, and (vi) a second output for providing ground terminal of the second DC voltage $V_{DC2}$.

The plurality of DC-DC voltage converters/voltage controllers receives the second DC voltage $V_{DC2}$, and providing a plurality of DC voltage corresponding to the plurality of loads $L_i$. Each of the plurality of DC-DC voltage converters/voltage controllers VCi has: (i) a first input coupling to the positive terminal of the second DC voltage $V_{DC2}$ from the first output of the control circuit, (ii) a second input coupling to the ground terminal of the second DC voltage $V_{DC2}$ from the second output of the control circuit, (iii) a first output for providing the positive terminal of a corresponding converted DC voltage to the first positive output terminal of a corresponding load $L_i$ of the UPS, and (iv) a second output for providing the ground terminal of the converted different DC voltage to the second positive output terminal of the corresponding load $L_i$ of the UPS.

When the UPS is in operation, if the AC power supply is available, the UPS provides a plurality of DC voltage outputs to the plurality of loads $L_i$, through the AC-DC converter, the control circuit, and the plurality of the DC-DC voltage converters/voltage controllers, and provides continuous DC charge to the rechargeable battery array. If the AC power supply becomes unavailable, or the first DC voltage $V_{DC1}$ to the control circuit is lower than a predetermined voltage level, the control circuit detects the unavailability of the AC power supply, or the decrease of the first DC voltage $V_{DC1}$, and switches the source of DC voltage from the first DC voltage to the DC supply voltage $V_B$ of the rechargeable battery array and provides continuous and constant DC voltage output to the plurality of loads Li through rechargeable battery array, the control circuit, and the plurality of the DC-DC voltage converters/voltage controllers.

The AC-DC converter converts the input AC power supply voltage to the first DC voltage $V_{DC1}$. In one embodiment, the AC-DC converter reduces the input AC power supply voltage to the first DC voltage VDC1 with a switch-mode power supply circuit. In another embodiment, the AC-DC converter reduces the input AC power supply voltage to a first AC voltage VDC1 with a transformer, and converts the first AC voltage to the first DC voltage VDC1 with a rectifier circuit, and a filtering circuit.

In one embodiment, the battery charger receives the first DC voltage $V_{DC1}$ from the AC-DC converter and provides stable first DC voltage $V_{DC1}$ to the rechargeable battery array to store electrical energy in the rechargeable battery array. In one embodiment, the battery charger includes a monitoring system indicating whether the battery charger is charging the rechargeable battery array and the status of charging/discharging of the rechargeable battery array.

In one embodiment, the control circuit controls the source of the DC voltage to the plurality of the DC-DC voltage converters/voltage controllers VCi such that when the AC power supply is available, the plurality of the DC-DC voltage converters/voltage controllers VCi receive the first DC voltage $V_{DC1}$ from the AC-DC converter. When the AC power supply is not available, the control circuit detects the unavailability of the AC power supply and switches the source of DC voltage from the first DC voltage $V_{DC1}$ of the AC-DC converter to the DC supply voltage $V_B$ of the rechargeable battery array to provide continuous and constant DC voltage outputs to the plurality of the loads $L_i$, so that the plurality of the loads $L_i$ receive their corresponding DC voltages. In another embodiment, the control circuit controls the source of the DC voltage to the plurality of the DC-DC voltage converters/voltage controllers VCi such that when the AC power supply is available, the plurality of the DC-DC voltage converters/voltage controllers VCi receive the first DC voltage $V_{DC1}$ from the AC-DC converter. When the first DC voltage $V_{DC1}$ is lower than a predetermined threshold level caused by the voltage reduction of the AC power supply, or instability of the AC power supply, the control circuit detects the voltage reduction of the AC power supply or instability of the AC power supply, and switches the source of DC voltage from the first DC voltage $V_{DC1}$ of the AC-DC converter to the DC supply voltage $V_B$ of the rechargeable battery array to provide continuous and constant DC voltage outputs to the plurality of the loads $L_i$, so that the plurality of the loads $L_i$ receive their corresponding DC voltages.

In one embodiment, the output DC voltage of each of the plurality of the DC-DC voltage converters/voltage controllers VCi is individually controllable and adjustable to provide a DC voltage output to the corresponding load. In one embodiment, the uninterruptible power supply further includes a DC voltage/current monitoring device. The DC voltage/current monitoring device is switchable to each of the plurality of output terminals of the DC-DC voltage converter/voltage controller to monitor the output DC voltage/current to each of the plurality of the loads.

In one embodiment, the uninterruptible power supply has a battery charge monitoring system to monitor the percentage electrical energy stored in the rechargeable battery array, and the level of rechargeable battery discharging. In another embodiment, the uninterruptible power supply has a surge protection circuit to protect the plurality of the loads from damage caused by electrical shocks. In yet another embodiment, the uninterruptible power supply has a current limiting circuit to protect the rechargeable battery array from damage caused by excessive current demand from the plurality of the loads.

In one embodiment, the rechargeable battery array of the uninterruptible power supply includes Sealed Lead Acid (SLA) battery, Nickel Cadmium (NiCd) battery, Nickel Metal Hydride (NiMH) battery, Lithium Ion (Li-Ion) battery, Lithium Ion Polymer battery, or any combinations thereof. In one embodiment, the uninterruptible power supply includes a DC connector for recharging mobile phones, personal digital assistants, portable music players, or other portable electronic devices.

In another aspect, the present invention relates to a method for providing an uninterruptible power supply (UPS) for home/office networking and communication system. The method includes the steps of: (i) converting an input AC power supply to a first DC voltage $V_{DC1}$, (ii) recharging a rechargeable battery array to store electric energy by using a battery charger and the first DC voltage $V_{DC1}$, and producing a DC battery output voltage $V_B$, (iii) generating a plurality of corresponding DC voltages by a plurality of DC-DC voltage converter/voltage controllers from the first DC voltage $V_{DC1}$, and (iv) providing the plurality of corresponding DC voltages to a plurality of loads.

In one embodiment, the method includes the step of generating a plurality of corresponding DC voltages by a plurality of DC-DC voltage converter/voltage controllers from the DC battery output voltage $V_B$, when the input AC power supply is not available. In another embodiment, the method includes the step of generating a plurality of corresponding DC voltages by a plurality of DC-DC voltage converter/voltage controllers from the DC battery output voltage $V_B$, when the input AC power supply becomes unstable or the first DC voltage $V_{DC1}$ is decreased to a predetermined voltage level. In one embodiment, the method includes the step of individually controlling and adjusting the DC output voltage of each of the plurality of the DC-DC voltage converter/voltage controllers. In one embodiment, the method includes the step of switchably monitoring the output DC voltage/current to each of the plurality of the loads. In another embodiment, the method includes the step of monitoring the percentage electrical energy stored in the rechargeable battery array, and the level of rechargeable battery discharging by using a battery charge monitoring system. In yet another embodiment, the method includes the step of providing surge protection circuit to protect the plurality of the loads from damage caused by electrical shocks. In a further embodiment, the method includes the step of providing a current limiting circuit to protect the rechargeable battery array from damage caused by excessive current demand from the plurality of the loads.

In one embodiment, the rechargeable battery array includes Sealed Lead Acid (SLA) battery, Nickel Cadmium (NiCd) battery, Nickel Metal Hydride (NiMH) battery, Lithium Ion (Li-Ion) battery, Lithium Ion Polymer battery, or any combinations thereof. The method also includes the step of providing a DC connector for recharging mobile phones, personal digital assistants, portable music players, or other portable electronic devices.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

Further features and benefits of the present invention will be apparent from a detailed description of preferred embodiments thereof taken in conjunction with the following drawings, wherein similar elements are referred to with similar reference numbers, and wherein.

DETAILED DESCRIPTION OF THE PRESENT INVENTION

Figure 1:
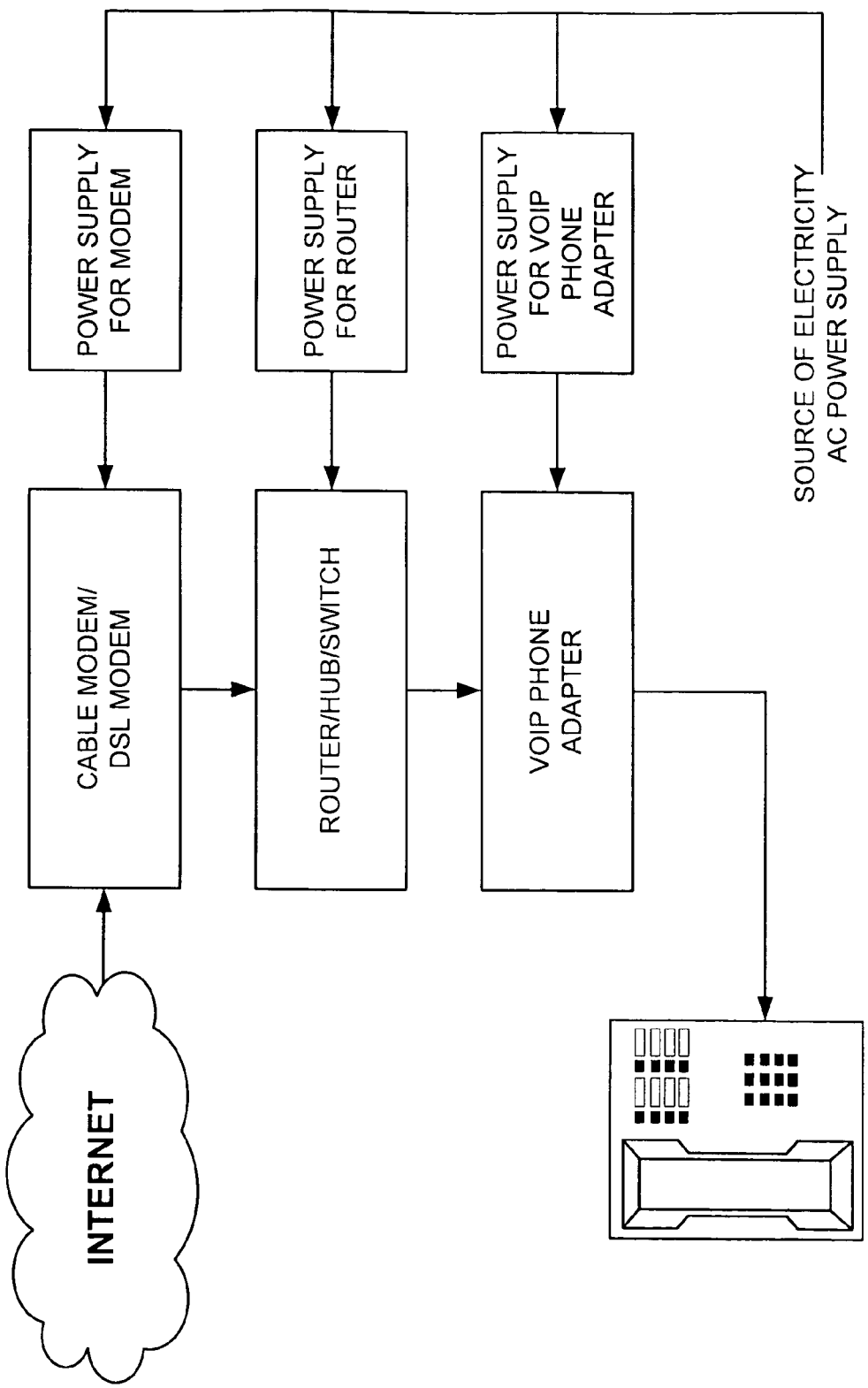
FIG. 1 shows one block diagram of a traditional configuration of VOIP telephone system.
Figure 2:
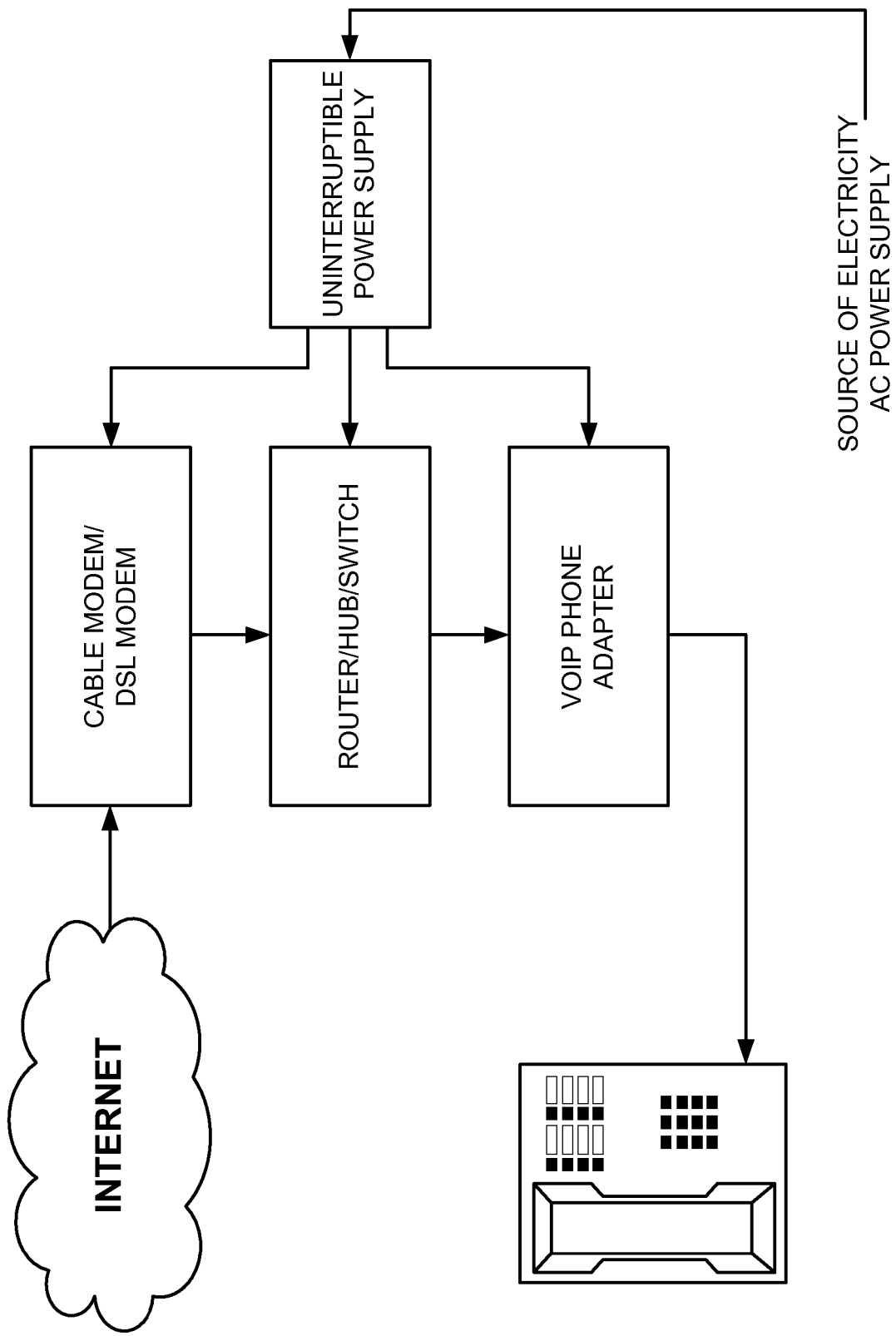
FIG. 2 shows a typical system configuration block diagram of a home/office networking and communication system using an uninterruptible power supply for home/office networking and communication system according to another embodiment of the present invention.

Prior to a detailed description of the present invention(s), the following definitions are provided as an aid to understanding the subject matter and terminology of aspects of the present invention(s), and not necessarily limiting of the present invention(s), which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. A capitalized term within the glossary usually indicates that the capitalized term has a separate definition within the glossary. However, the capitalization or lack thereof within the remainder of this document is not intended to be necessarily limiting unless the context clearly indicates that such limitation is intended. A router is a computer networking device that forwards data packets across a network toward their destinations, through a process known as routing. In this document, the terms "router", "hub" and "switch" are interchangeable. The terms "unit" and "circuit" are interchangeable. Unless otherwise described, a DC power supply is represented as having a positive terminal and a ground terminal.

Definitions/Glossary

AC: alternate current.
AGM: absorbent glass mat, a class of lead-acid battery in which the electrolyte is absorbed into a fiberglass mat. It is one of the types of VRLA battery. The plates in an AGM battery may be flat like wetcell lead-acid batteries, or they may be wound in tight spiral. Their unique (for lead acid chemistries) construction also allows for the lead in their plates to be purer as they no longer need to support their own weight as in traditional cells.
DC: direct current.
IC: integrated circuit.
Li-Ion: Lithium ion batteries, a type of rechargeable battery commonly used in consumer electronics. They are currently one of the most popular types of battery, with one of the best energy-to-weight ratios, no memory effect and a slow loss of charge when not in use.
NiCd: Nickel-cadmium battery, a popular type of rechargeable battery for portable electronics and toys using the metals nickel (Ni) and cadmium (Cd) as the active chemicals.

NiMH: Nickel metal hydride battery, a type of rechargeable battery similar to a nickel-cadmium (NiCd) battery but has a hydrogen absorbing alloy for the anode instead of cadmium.

PWM: pulse-width modulation: a signal or power source involves the modulation of its duty cycle, to either convey information over a communication channel or control the amount of power sent to a load.

VRLA: valve regulated lead acid and is the designation for maintenance-free lead-acid batteries. VRLA batteries can present several technologies such as: absorbent glass mat battery or gel battery. There is always a safety valve present, hence the name valve-regulated.

VOIP: voice over internet protocol, is the routing of voice conversations over the Internet or through any other IP-based network;

System Descriptions

Figure 3:
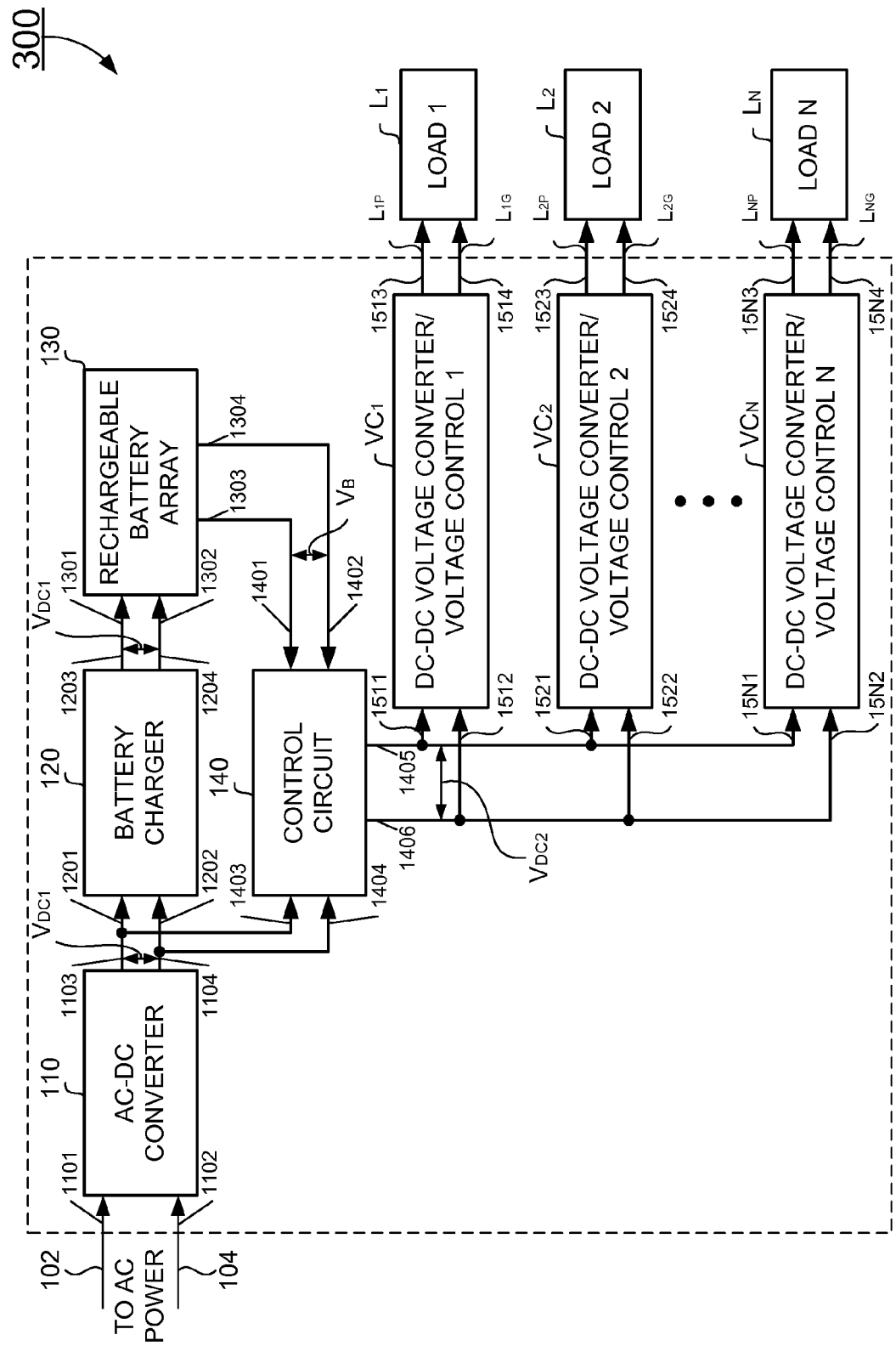
FIG. 3 shows a block diagram of an uninterruptible power supply for home/office networking and communication system according to one embodiment of the present invention.

Referring now to FIG. 3, a block diagram of an uninterruptible power supply (UPS) 300 for home/office networking and communication system is shown according to one embodiment of the present invention. The uninterruptible power supply 300 has a first input 102 for receiving the phase wire of an AC power supply, a second input 104 for receiving the neutral wire of the AC power supply from a wall electrical socket. The uninterruptible power supply 300 has a plurality of DC outputs, $L_{1P}$, $L_{1G}$, $L_{2P}$, $L_{2G}$, ..., $L_{NP}$, and $L_{NG}$ for supplying DC voltages to a plurality of loads $\{L_i\}$, i=1, 2, ..., N, where N is positive integer. The output terminals labeled as P such as $L_{1P}$, $L_{2P}$, ..., and $L_{NP}$ supply positive voltage to the plurality of loads, and the output terminals labeled as G such as $L_{1G}$, $L_{2G}$, ..., and $L_{NG}$ supply negative voltage (or ground) to the plurality of loads.

Within the uninterruptible power supply 300, there are an AC-DC converter 110, a battery charger 120, a rechargeable battery array 130, a control circuit 140, a plurality of DC to DC voltage converters/voltage controls $\{VC_i\}$, i=1, 2, ..., N.

The AC-DC converter 110 converters the input AC power supply voltage $V_{AC}$ to a first DC voltage $V_{DC1}$. The AC-DC converter 110 has a first input terminal 1101 for receiving the phase wire of the AC power supply, and a second input 1102 for receiving the neutral wire of the AC power supply. The AC-DC converter 110 has a first output 1103 for providing the positive terminal of the first DC voltage $V_{DC1}$, and a second output 1104 for providing the ground terminal of the first DC voltage $V_{DC1}$.

In one embodiment, the AC-DC converter 110 comprises a transformer to reduce the input AC power supply voltage $V_{AC}$ to a lower AC voltage, a rectifier circuit to converter the lower AC voltage to the first DC voltage $V_{DC1}$, and an filter circuit to filter out the ripples of the first DC voltage $V_{DC1}$. In another embodiment, the AC-DC converter 110 comprises a switch-mode power supply circuit to convert the input AC power supply voltage $V_{AC}$ to the first DC voltage $V_{DC1}$. Those skilled in the art will appreciate that both methods are performing the same function, but the second approach has following advantages:

- accepts wider input voltage range such as 85-265 $V_{AC}$;
- has smaller size, lower weight, and lower total cost;
- has good line and load regulation, no need of additional linear regulators;
- has higher efficiency, up to 80%;
- has overload, short circuit and thermal protection;
- is convenient for mass production due to surface mount device (SMD); and
- has universal design for wide range of output currents and voltages.

The battery charger 120 receives the first DC voltage $V_{DC1}$ from the AC-DC converter 110, and provides electric charge to the rechargeable battery array 130. The battery charger 120 has a first input terminal 1201 for receiving the positive terminal of the first DC voltage $V_{DC1}$, a second input 1202 for receiving the ground terminal of the first DC voltage $V_{DC1}$, a first output 1203 for providing the positive terminal of the output DC voltage, and a second output 1204 for providing the ground terminal of the output DC voltage. The output DC voltage is substantially similar to the first DC voltage $V_{DC1}$.

In one embodiment, the battery charger 120 is a simple DC power source. The simple charger works by connecting a constant DC power source to the battery being charged. The simple charger charges the rechargeable battery array 130 in a constant basis, and it does not vary the charge based on time or the charge on the rechargeable battery array 130. This simple charger is inexpensive, but there is a tradeoff in quality. Typically, a simple charger takes longer to charge a battery to prevent severe over-charging. Even so, a battery left in a simple charger for too long will be weakened or destroyed due to over-charging.

In another embodiment, the battery charger 120 is a timer-based charger. The output of a timer-based charger is terminated after a pre-determined time. Timer chargers were the most common type for Ni—Cd cells for example. The disadvantage of this approach is that if batteries of lower capacity were charged then they would be overcharged, and if batteries of higher capacity were charged they would be only partly charged. With the trend for battery technology to increase capacity year on year, an old timer charger would only partly charge the newer batteries.

In a third embodiment, the battery charger 120 is an intelligent charger. Its output current depends upon the battery's state. An intelligent charger may monitor the battery's voltage, temperature and/or time under charge to determine the optimum charge current at that instant. Charging is terminated when a combination of the voltage, temperature and/or time indicates that the battery is fully charged. For NiCd and NiMH batteries, the voltage over the battery increases slowly during the charging process, until the battery is fully charged. After that, the voltage decreases, which indicates to an intelligent charger that the battery is fully charged.

In a fourth embodiment, the battery charger 120 is a fast charger. The fast charger makes use of control circuitry in the batteries being charged to rapidly charge the batteries without damaging the cells' elements. Most are also capable of acting as a standard overnight charger if used with standard NiMH cells that do not have the special control circuitry.

The battery charger 120 has an optional charge/discharge monitoring system, especially for the intelligent battery charger. The charge/discharge monitoring system indicates the charge/discharge status, and shuts off the battery charger when the rechargeable battery array 130 is fully charged.

The rechargeable battery array 130 contains batteries that can be restored to full charge by the application of electrical energy. The rechargeable battery array 130 has a first input terminal 1301 for receiving the positive terminal of the first DC voltage $V_{DC1}$ from the battery charger 120, a second input terminal 1302 for receiving the ground terminal of the first DC voltage $V_{DC1}$ from the battery charger 120, a first output 1303 for providing the positive terminal of the voltage supply $V_B$, and a second output 1304 for providing the ground terminal of the voltage supply $V_B$. The rechargeable battery array 130 comes in many different designs using different chemistry. Only rechargeable batteries can be charged using a battery charger. Attempting to recharge non-rechargeable batteries may lead to a battery explosion. Some types of rechargeable batteries are susceptible to damage due to reverse charging if they are fully discharged; other types need to be fully discharged occasionally in order to maintain the capacity for deep discharge. There exist fully integrated battery chargers that optimize the charging current.

In one embodiment, the rechargeable battery array 130 contains sealed lead acid (SLA) batteries. There are three types of SLA battery:

wet lead acid battery: The major advantage of this chemistry is its low cost—a large battery (e.g. 70 Ah) is relatively cheap when compared to other chemistries. However, this battery chemistry has lower energy density than other battery chemistries available today. Its applications include vehicles, alarm systems, and it is widely used in uninterruptible power supplies.

gel battery: a type of valve regulated lead acid battery that uses gelified electrolyte. Unlike a traditional wet-cell lead-acid battery, the cells of a gel battery are valve-regulated. Its applications include automobiles, motorcycle, boats, aircraft, and other motorized vehicles.

absorbed glass mat (AGM): a type of valve regulated lead acid battery. The plates in an AGM battery may be flat like wetcell lead-acid batteries, or they may be wound in tight spirals. In cylindrical AGM's, the plates are thin and wound, like most consumer disposable and rechargeable cells, into spirals so they are also sometimes referred to as spiral wound. Its chemical composition are electrolytes absorbed into a fiberglass mat.

The rechargeable battery array 130 containing sealed lead acid (SLA) batteries are used for an uninterruptible power supply for home/office networking and communication system that requires a larger current, longer time without available AC power supply, and does not require small size and light weight.

In another embodiment, the rechargeable battery array 130 contains Nickel Cadmium (NiCd) batteries. This chemistry gives the longest cycle life (over 1500 cycles), but has low energy density compared to some of the other chemistries. Batteries using older technology suffer from memory effect as known to those skilled in the art, but this has been reduced drastically in modern batteries. Cadmium is toxic to most life forms, so poses environmental concerns. Its chemical composition is nickel for the cathode and cadmium for the anode. The rechargeable battery array 130 containing NiCd batteries are used for an uninterruptible power supply for home/office networking and communication system that requires a stronger current, longer time without available AC power supply, and does not require small size and light weight.

In a third embodiment, the rechargeable battery array 130 contains Nickel metal hydride (NiMH) battery. Similar to a nickel-cadmium (NiCd) battery but has a hydride absorbing alloy for the anode instead of cadmium; therefore, it is less detrimental to the environment. A NiMH battery can have two to three times the capacity of an equivalent size NiCd and the memory effect is not as significant. Its chemical composition is nickel for the cathode and a hydride absorbing alloy for the anode. The rechargeable battery array 130 containing NiMH batteries are used for an uninterruptible power supply for home/office networking and communication system that requires a stronger current, longer time without available AC power supply, longer battery life, less memory effect, and does not require small size and light weight.

In a fourth embodiment, the rechargeable battery array 130 contains Lithium ion (Li-Ion) batteries. A relatively modern battery chemistry that offers a very high charge density, i.e. a light battery stores a lot of energy. The Lithium ion battery does not suffer from any memory effect whatsoever. Its chemical composition is $LiCoO_2$, $LiMn_2O_4$, $LiNiO_2$ or Li-Ph for the cathode and carbon for the anode. One alternative to the Li-Ion battery is the Lithium ion polymer battery. The Lithium ion polymer battery has similar characteristics to lithium-ion, but with slightly less charge density and a greater life cycle degradation rate. The rechargeable battery array 130 containing Li-Ion batteries or Lithium ion polymer batteries are used for an uninterruptible power supply for home/office networking and communication system that requires a stronger current, no memory effect, small size and light-weight.

The control circuit 140 has a first input 1401 for receiving the positive terminal of the first DC voltage $V_{DC1}$, a second input 1402 for receiving the ground terminal of the first DC voltage $V_{DC1}$, a third input 1403 for receiving the positive terminal of the voltage Supply $V_B$, a fourth input 1404 for receiving the ground terminal of the voltage supply $V_B$, a first output 1405 for providing the positive terminal of a second DC voltage $V_{DC2}$, and a second output 1406 for providing the ground terminal of the second DC voltage $V_{DC2}$. The control circuit 140 receives DC voltages from both the AC-DC converter 110 (input terminals 1401 and 1402, respectively) and the rechargeable battery array 130 (input terminal 1403 and 1404, respectively), and selects one DC voltage for output through the output terminals 1405 and 1406, respectively.

If the AC power supply is received at the input 1101 and 1102 of the AC-DC converter 110, the rechargeable battery array 130 maintains the electric charge and the voltage supply $V_B$ is the same as the first DC voltage $V_{DC1}$. In this case, the output terminals 1103 and 1104 of the AC-DC converter 110 are electrically coupled to the output terminals 1405 and 1406 of the control circuit 140, respectively. The second DC voltage $V_{DC2}$ draws electrical power from the output terminals 1103 and 1104 of the AC-DC converter 110. If the AC power supply is not received at the input 1101 and 1102 of the AC-DC converter 110, or the first DC voltage $V_{DC1}$ is lower than the voltage supply $V_B$ of the rechargeable battery array 130 by a predetermined amount, the control circuit 140 switches the output voltage from the output terminals 1103 and 1104 of the AC-DC converter 110 to the output terminals 1303 and 1304 of the voltage supply $V_B$, respectively. The output switch over should not have any noticeable change in the output voltage.

The uninterruptible power supply for home/office networking and communication system has a plurality of DC-DC voltage converters/voltage controllers $\{VC_i\}$, i=1, 2, . . . , N. Each of the plurality of DC-DC voltage converters has an individual DC voltage output for a load electrically coupled to the output of the DC voltage converter/voltage controller. The plurality of DC-DC voltage converters/voltage controllers have similar configuration, only difference among them is the DC voltage outputs are separately adjusted according to the specification or the requirement of customers. One DC voltage converter/voltage controller $VC_1$ is described here as an example. The DC voltage converter/voltage controller $VC_1$ has a first input 1511 coupling to the positive terminal of the second DC voltage $V_{DC2}$ from the first output 1405 of the control circuit 140, a second input 1512 coupling to the ground terminal of the second DC voltage $V_{DC2}$ from the second output 1406 of the control circuit 140, a first output 1513 for providing the positive terminal of a third DC voltage to the first positive output terminal $L_{1P}$ of the uninterruptible power supply, and a second output 1514 for providing the ground terminal of the third DC voltage to the second output terminal $L_{1G}$ of the uninterruptible power supply.

When the AC power supply is available, the uninterruptible power supply provides a plurality of DC voltage outputs to the plurality of loads $\{L_i\}$, i=1, 2, ..., N, through the AC-DC converter 110, the control circuit 140, and the plurality of the DC-DC voltage converters/voltage controllers $\{VC_i\}$, and provides continuous DC charge to the rechargeable battery array 130. When the AC power supply becomes unavailable, or the first DC voltage $V_{DC1}$ to the control circuit 140 is lower than a predetermined voltage level, the control circuit 140 detects the unavailability of the AC power supply, or the decrease of the first DC voltage $V_{DC1}$, and switches the source of DC voltage from the first DC voltage $V_{DC1}$ to the DC supply voltage $V_B$ of the rechargeable battery array 130 and provides continuous and constant plurality of DC voltage outputs to the plurality of loads through rechargeable battery array 130, the control circuit 140, and the plurality of the DC-DC voltage converters/voltage controllers. Optionally, the uninterruptible power supply for home/office networking and communication system includes an indicator displaying the source of the DC voltage to the plurality of the loads.

The plurality of the output DC voltages of the uninterruptible power supply for home/office networking and communication system are individually controlled and adjustable to provide a plurality of DC voltage outputs for different loads according the requirement of the home/office networking and communication system. If some of the loads require the same DC voltage as the first DC voltage $V_{DC1}$ from the AC-DC converter 110 or the DC supply voltage $V_B$ from the rechargeable battery array 130, the output terminals 1405, and 1406 can be electrically coupled directly to these loads without the DC-DC voltage converters/voltage controllers.

The output DC voltage of each DC-DC voltage converter/voltage controller can be preset to a DC voltage according to a specification, or requirement. It may also be adjusted by the end-users through either analog adjustment or digitally controlled adjustment, as known to those skilled in the art. These DC voltage converters/voltage controllers may also be implemented with single integrated circuit chip.

Figure 4:
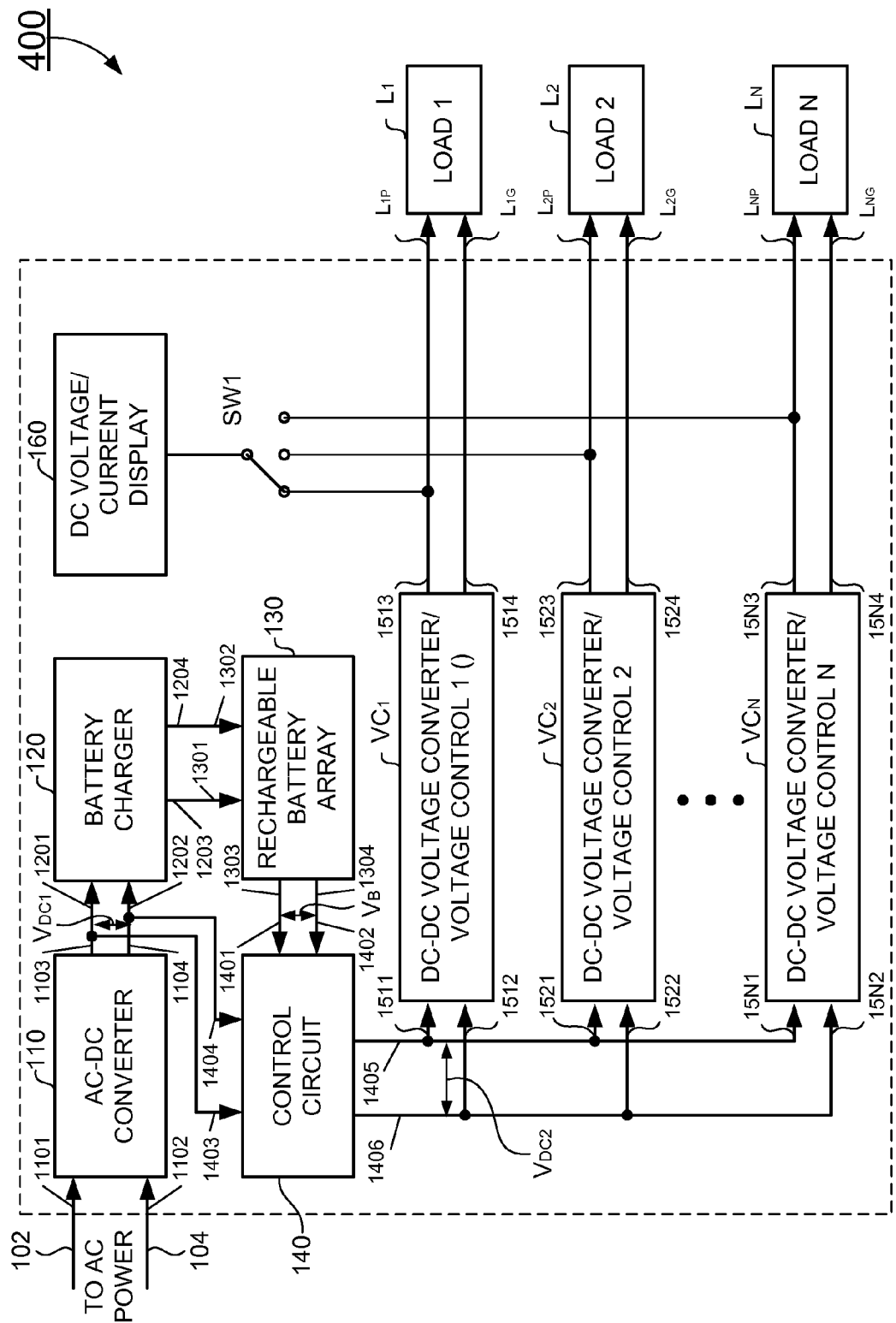
FIG. 4 shows a block diagram of an uninterruptible power supply for home/office networking and communication system with a voltage/current monitor according to one embodiment of the present invention.

Referring now to FIG. 4, an uninterruptible power supply for home/office networking and communication system 400 is shown according to another embodiment of the present invention. In this embodiment, an optional voltage/current monitoring device 160 is included. A switch SW1 is added to switch among DC voltage outputs of the plurality of the DC voltage converters/voltage controllers. When the switch SW1 is switched to a particular output of a DC-DC voltage converter/voltage controller $VC_1$, the DC output voltage and/or the DC output current may be monitored by the DC voltage/current monitoring device 160. Other DC voltage outputs may be monitored in a similar fashion by simply switching to DC outputs of other DC-DC voltage converters/voltage controllers $VC_i$.

Figure 5:
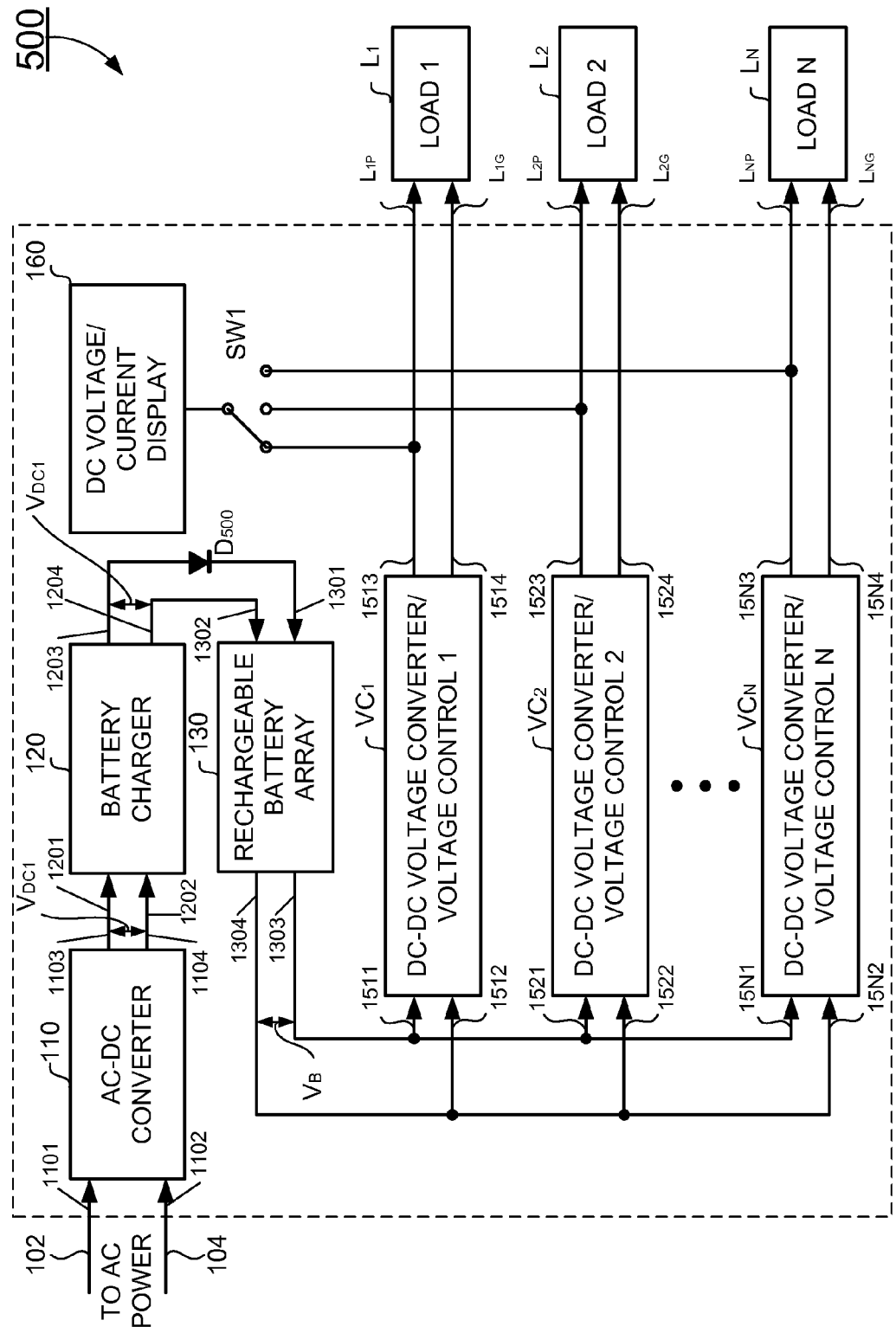
FIG. 5 shows a block diagram of an uninterruptible power supply for home/office networking and communication system with a voltage/current monitor according to another embodiment of the present invention.

Referring now to FIG. 5, an uninterruptible power supply for home/office networking and communication system 500 is shown according to another embodiment of the present invention. In this embodiment, an optional voltage/current monitoring device 160 is included. A switch SW1 is added to switch among DC voltage outputs of the plurality of the DC voltage converters/voltage controllers. When the switch SW1 is switched to a particular output of a DC-DC voltage converter/voltage controller $VC_i$, the DC output voltage and/or the DC output current may be monitored by the DC voltage/current monitoring device 160. Other DC voltage outputs may be monitored in a similar fashion by simply switching to DC outputs of other DC-DC voltage converters/voltage controllers $VC_i$.

The major difference between the embodiment shown in FIG. 4 and the embodiment shown in FIG. 5 is that the control circuit 140 was removed and it is replaced with a diode $D_{500}$. According to this embodiment, the AC power supply is received at the first and the second terminal of the AC-DC converter 110. The first DC voltage $V_{DC1}$ from the first and the second output terminals 1103 and 1104 of the AC-DC converter 110 is provided to the first and the second input terminals of the battery charger 1201 and 1202, respectively. Then, the first output terminal 1203 of the battery charger 120 is electrically coupled to the anode of the diode $D_{500}$, and the cathode of the diode $D_{500}$ is electrically coupled to the first input terminal of the rechargeable battery array 1301, and the second output terminal 1204 of the battery charger 120 is electrically coupled to the second input terminal of the rechargeable battery array 1302. The diode $D_{500}$ is used to block the current going backward to the battery charger 120 when the AC power supply is unavailable or the first DC voltage $V_{DC1}$ from the output terminals of the battery charger 120 is lower than the DC supply voltage $V_B$ of the rechargeable battery array 130.

According to this embodiment, the first DC voltage $V_{DC1}$ of the AC-DC converter 110 is provided to the input terminals of the battery charger 120. The first DC voltage $V_{DC1}$ of the battery charger 120 is provided to the input terminals of the rechargeable battery array 130 through the diode $D_{500}$ and provides constant electrical charge to the rechargeable battery array 130 when the AC power supply is available. The rechargeable battery array 130 provides DC supply voltage $V_B$ to the plurality of the DC-DC voltage converters/voltage controllers. When the AC power supply becomes unavailable, or the first DC voltage $V_{DC1}$ from the output terminals of the battery charger 120 is lower than the DC voltage across the first and the second input terminals 1301 and 1302 of the rechargeable battery array 130, the connection between the first output terminal 1203 of the battery charger 120 and the first input terminal 1301 is shut down by the diode $D_{500}$, and the rechargeable battery array 130 is the source of the DC voltage to the plurality of the DC-DC voltage converters/voltage controllers.

In one embodiment, the uninterruptible power supply for home/office networking and communication system further has a battery charge indicator to monitor the percentage electrical energy stored in the rechargeable battery array 130. In another embodiment, the uninterruptible power supply for home/office networking and communication system further includes a surge protection circuit to protect the plurality of the loads from damage caused by electrical shocks. In yet another embodiment, the uninterruptible power supply for home/office networking and communication system incorporates a current limiting circuit to protect the rechargeable battery array 130 from damage caused by excessive current demand from the plurality of the loads.

In one embodiment, a DC connector is configured to the uninterruptible power supply for recharging mobile phones, personal digital assistants, portable music players, or other portable electronic devices.

In another aspect, the present invention relates to a method for providing an uninterruptible power supply (UPS) for home/office networking and communication system. The method includes the steps of: (i) converting an input AC power supply to a first DC voltage $V_{DC1}$, (ii) recharging a rechargeable battery array to store electric energy by using a battery charger and the first DC voltage $V_{DC1}$, and producing a DC battery output voltage $V_B$, (iii) generating a plurality of corresponding DC voltages by a plurality of DC-DC voltage converter/voltage controllers from the first DC voltage $V_{DC1}$, and (iv) providing the plurality of corresponding DC voltages to a plurality of loads.

In one embodiment, the method includes the step of generating a plurality of corresponding DC voltages by a plurality of DC-DC voltage converter/voltage controllers from the DC battery output voltage $V_B$, when the input AC power supply is not available. In another embodiment, the method includes the step of generating a plurality of corresponding DC voltages by a plurality of DC-DC voltage converter/voltage controllers from the DC battery output voltage $V_B$, when the input AC power supply becomes unstable or the first DC voltage $V_{DC1}$ is decreased to a predetermined voltage level. In one embodiment, the method includes the step of individually controlling and adjusting the DC output voltage of each of the plurality of the DC-DC voltage converter/voltage controllers. In one embodiment, the method includes the step of switchably monitoring the output DC voltage/current to each of the plurality of the loads. In another embodiment, the method includes the step of monitoring the percentage electrical energy stored in the rechargeable battery array, and the level of rechargeable battery discharging by using a battery charge monitoring system. In yet another embodiment, the method includes the step of providing surge protection circuit to protect the plurality of the loads from damage caused by electrical shocks. In a further embodiment, the method includes the step of providing a current limiting circuit to protect the rechargeable battery array from damage caused by excessive current demand from the plurality of the loads.

In one embodiment, the rechargeable battery array includes Sealed Lead Acid (SLA) battery, Nickel Cadmium (NiCd) battery, Nickel Metal Hydride (NiMH) battery, Lithium Ion (Li-Ion) battery, Lithium Ion Polymer battery, or any combinations thereof. The method also includes the step of providing a DC connector for recharging mobile phones, personal digital assistants, portable music players, or other portable electronic devices.

Such an uninterruptible power supply (UPS) for home/office networking and communication system is especially useful to making the internet service available in a house or an office when the power supply is not available. It keeps the telephone phone service and internet service running. In turn, it also makes a computer such as a laptop accessible for the internet, and an alarm service available if the alarm system relies on telephone service.

The above features as well as additional features and aspects of the present invention are disclosed herein and will become apparent from the foregoing description of preferred embodiments of the present invention.

While there has been shown several and alternate embodiments of the present invention, it is to be understood that certain changes can be made as would be known to one skilled in the art without departing from the underlying scope of the present invention as is discussed and set forth above and below including claims. Furthermore, the embodiments described above and claims set forth below are only intended to illustrate the principles of the present invention and are not intended to limit the scope of the present invention to the disclosed elements.

What is claimed is:

1. An uninterruptible power supply (UPS) for home/office networking and communication system, comprising:

a. a first input for receiving the phase wire of an AC power supply, b. a second input for receiving the neutral wire of the AC power supply, c. an AC-DC converter adapted for converting the AC power supply connectable to the first input and second input from AC to DC to provide a first DC voltage $V_{DC1}$, wherein the AC-DC converter comprises:
  (i) a first input coupling to the phase wire of the AC power supply;
  (ii) a second input coupling to the neutral wire of the AC power supply;
  (iii) a first output for providing a positive terminal of the first DC voltage $V_{DC1}$; and
  (iv) a second output for providing ground of the first DC voltage $V_{Dc1}$;

d. a battery charger, wherein the battery charger comprises
  (i) a first input coupling to the positive terminal of the first DC voltage $V_{DC1}$ of the AC-DC converter,
  (ii) a second input coupling to the ground terminal of the first DC voltage $V_{DC1}$ of the AC-DC converter,
  (iii) a first output for providing the positive terminal of the first DC voltage $V_{DC1}$ to the first input of the rechargeable battery array; and
  (iv) a second output for providing the ground terminal of the first DC voltage $V_{DC1}$ to the second input of the rechargeable battery array;

e. a rechargeable battery array adapted for receiving a first DC voltage $V_{DC1}$ and storing electrical energy, wherein the rechargeable battery array comprises:
  (i) a first input for receiving a positive terminal of the first DC voltage $V_{DC1}$;
  (ii) a second input for receiving the ground terminal of the first DC voltage $V_{DC1}$;
  (iii) a first output for providing a positive terminal of a DC supply voltage $V_B$; and
  (iv) a second output for providing a ground terminal of the DC supply voltage $V_B$;

f. a control circuit, wherein the control circuit comprises:
  (i) a first input coupling to the first output of the AC-DC converter for receiving the positive terminal of the first DC voltage $V_{DC1}$ from the AC-DC converter;
  (ii) a second input coupling to the second output of the AC-DC converter for receiving the ground terminal of the first DC voltage $V_{DC1}$ from the AC-DC converter;
  (iii) a third input coupling to the first output of the rechargeable battery array for receiving the positive terminal of the DC supply voltage $V_B$ from the rechargeable battery array;
  (iv) a fourth input coupling to the second output of the rechargeable battery array for receiving the ground terminal of the DC supply voltage $V_B$ from the rechargeable battery array;
  (v) a first output for providing positive terminal of a second DC voltage $V_{DC2}$; and
  (vi) a second output for providing ground terminal of the second DC voltage $V_{DC2}$;

g. a plurality of DC-DC voltage converters/voltage controllers {VCi}, i=1, 2, . . . , N corresponding to the plurality of loads Li, each of the plurality of DC-DC voltage converters/voltage controllers VCi comprising:
  (i) a first input coupling to the positive terminal of the second DC voltage $V_{DC2}$ from the first output of the control circuit;
  (ii) a second input coupling to the ground terminal of the second DC voltage $V_{DC2}$ from the second output of the control circuit;

(iii) a first output for providing the positive terminal of a corresponding converted DC voltage to the first positive output terminal of a corresponding load Li of the UPS; and (iv) a second output for providing the ground terminal of the converted different DC voltage to the second positive output terminal of the corresponding load Li of the UPS; and h. a plurality of output DC power terminals for a plurality of loads Li, {i}=1, 2, ... N, N being a positive integer, wherein each of the plurality of the output DC power terminals having a first positive output terminal LiP for providing a positive DC voltage and a second output terminal LiG for providing a ground terminal, and each of the output DC power terminals is capable of providing a corresponding output DC voltage;

wherein, in operation, when the AC power supply is available, the UPS provides a plurality of DC voltage outputs to the plurality of loads $L_i$, through the AC-DC converter, the control circuit, and the plurality of the DC-DC voltage converters/voltage controllers, and provides continuous DC charge to the rechargeable battery array, and when the AC power supply becomes unavailable, or the first DC voltage to the control circuit is lower than a predetermined voltage level, the control circuit detects the unavailability of the AC power supply, or the decrease of the first DC voltage $V_{DC1}$, and switches the source of DC voltage from the first DC voltage to the DC supply voltage $V_B$ of the rechargeable battery array and provides continuous and constant DC voltage output to the plurality of loads $L_i$ through rechargeable battery array, the control circuit, and the plurality of the DC-DC voltage converters/voltage controllers.

2. The uninterruptible power supply of claim 1, wherein the AC-DC converter converts the input AC power supply voltage to the first DC voltage $V_{DC1}$.

3. The uninterruptible power supply of claim 2, wherein the AC-DC converter converts the input AC power supply voltage to the first DC voltage $V_{DC1}$ with a switch-mode power supply circuit.

4. The uninterruptible power supply of claim 2, wherein the AC-DC converter converts the input AC power supply voltage to a first AC voltage $V_{DC1}$ with a transformer, and converts the first AC voltage to the first DC voltage $V_{DC1}$ with a rectifier circuit, and a filtering circuit.

5. The uninterruptible power supply of claim 2, wherein the battery charger receives the first DC voltage $V_{DC1}$ from the AC-DC converter and provides stable first DC voltage $V_{DC1}$ to the rechargeable battery array to store electrical energy in the rechargeable battery array.

6. The uninterruptible power supply of claim 5, wherein the battery charger further comprises a monitoring system indicating whether the battery charger is charging the rechargeable battery array and the status of charging/discharging of the rechargeable battery array.

7. The uninterruptible power supply of claim 6, wherein the control circuit controls the source of the DC voltage to the plurality of the DC-DC voltage converters/voltage controllers $VC_i$ such that when the AC power supply is available, the plurality of the DC-DC voltage converters/voltage controllers $VC_i$ receive the first DC voltage $V_{DC1}$ from the AC-DC converter, and when the AC power supply is not available, the control circuit detects the unavailability of the AC power supply and switches the source of DC voltage from the first DC voltage $V_{DC1}$ of the AC-DC converter to the DC supply voltage $V_B$ of the rechargeable battery array to provide continuous and constant DC voltage outputs to the plurality of the loads $L_i$, so that the plurality of the loads $L_i$ receive their corresponding DC voltages.

8. The uninterruptible power supply of claim 7, wherein the control circuit controls the source of the DC voltage to the plurality of the DC-DC voltage converters/voltage controllers $VC_i$ such that when the AC power supply is available, the plurality of the DC-DC voltage converters/voltage controllers $VC_i$ receive the first DC voltage $V_{DC1}$ from the AC-DC converter, and when the first DC voltage $V_{DC1}$ is lower than a predetermined threshold level caused by the voltage reduction of the AC power supply, or instability of the AC power supply, the control circuit detects the voltage reduction of the AC power supply or instability of the AC power supply, and switches the source of DC voltage from the first DC voltage $V_{DC1}$ of the AC-DC converter to the DC supply voltage $V_B$ of the rechargeable battery array to provide continuous and constant DC voltage outputs to the plurality of the loads $L_i$, so that the plurality of the loads $L_i$ receive their corresponding DC voltages.

9. The uninterruptible power supply of claim 8, wherein the output DC voltage of each of the plurality of the DC-DC voltage converters/voltage controllers $VC_i$ is individually controllable and adjustable to provide a DC voltage output to the corresponding load.

10. The uninterruptible power supply of claim 1 further comprises a DC voltage/current monitoring device, which is switchable to each of the plurality of output terminals of the DC-DC voltage converter/voltage controller to monitor the output DC voltage/current to each of the plurality of the loads.

11. The uninterruptible power supply of claim 1 further comprises a battery charge monitoring system to monitor the percentage electrical energy stored in the rechargeable battery array, and the level of rechargeable battery discharging.

12. The uninterruptible power supply of claim 1 further comprising a surge protection circuit to protect the plurality of the loads from damage caused by electrical shocks.

13. The uninterruptible power supply of claim 1 further comprising a current limiting circuit to protect the rechargeable battery array from damage caused by excessive current demand from the plurality of the loads.

14. The uninterruptible power supply of claim 1, wherein the rechargeable battery array comprises Sealed Lead Acid (SLA) battery, Nickel Cadmium (NiCd) battery, Nickel Metal Hydride (NiMH) battery, Lithium Ion (Li-Ion) battery, Lithium Ion Polymer battery, or any combinations thereof.

15. The uninterruptible power supply of claim 1 further comprising a DC connector for recharging mobile phones, personal digital assistants, portable music players, or other portable electronic devices.

* * * * *